United States Patent [19]

Menger-Hammond et al.

[11] Patent Number: 4,472,513

[45] Date of Patent: Sep. 18, 1984

[54] LASER-SYNTHESIZED CATALYSTS

[75] Inventors: Eva L. Menger-Hammond, Madison; Miroslav Novotny, Denville, both of N.J.

[73] Assignee: Allied Corporation, Morris Township, Morris County, N.J.

[21] Appl. No.: 433,296

[22] Filed: Oct. 7, 1982

Related U.S. Application Data

[63] Continuation-in-part of Ser. No. 220,638, Dec. 29, 1980, abandoned, which is a continuation of Ser. No. 75,554, Sep. 14, 1979, abandoned.

[51] Int. Cl.³ .................. B01J 37/34; B01J 31/00; B05D 3/06; B23K 9/00
[52] U.S. Cl. .................. 502/5; 75/0.5 A; 75/0.5 B; 75/0.5 C; 219/121 LM; 427/53.1; 502/150; 502/159; 502/173; 502/185
[58] Field of Search .............. 252/410, 430, 447, 472; 427/53.1, 91, 250; 75/0.5 A, 0.5 B, 0.5 C; 264/10; 219/121 L, 121 LM; 430/945; 502/5, 150, 159, 173, 182, 183, 185, 300

[56] References Cited

U.S. PATENT DOCUMENTS

| | | | |
|---|---|---|---|
| 2,223,777 | 12/1940 | Beek | 252/477 R |
| 2,329,933 | 9/1943 | Nord | 252/430 |
| 3,011,979 | 12/1961 | Warner | 252/430 |
| 3,515,679 | 6/1970 | Gaeth et al. | 252/477 R |
| 3,560,258 | 2/1971 | Brisbane | 427/91 |
| 3,578,609 | 5/1971 | Haag et al. | 252/430 |
| 4,046,712 | 9/1977 | Cairns et al. | 252/447 |

FOREIGN PATENT DOCUMENTS

| | | | |
|---|---|---|---|
| 2523982 | 12/1976 | Fed. Rep. of Germany | 427/53.1 |
| 1134965 | 11/1968 | United Kingdom | 427/91 |

OTHER PUBLICATIONS

IBM-Tech. Disclosure Bull.-vol. 21; No. 10; Mar. 1979; p. 4286, "Ohmic Contacts Made by Lasers".

J. Appl. Phys.-vol. 43; No. 11-pp. 4680-4683; Nov. 1972, "Vapor Deposition Of Platinum Using CW Laser Energy", Hess et al.

*Primary Examiner*—P. E. Konopka
*Attorney, Agent, or Firm*—Thomas D. Hoffman; Gerhard H. Fuchs

[57] ABSTRACT

A solid catalyst material is evaporated from a coating on a transparent solid substrate and is condensed onto a solid polymeric organic catalyst carrier or into a liquid, by passing a laser beam through said solid transparent substrate and onto the back of said coating and contacting said catalyst carrier or liquid with the evaporated catalyst material. Suitably, the laser source is a ruby or a rhodamine dye laser; a suitable catalyst material is rhodium metal; and a suitable solid polymeric organic catalyst carrier is polystyrene crosslinked by divinyl benzene and a suitable liquid is aqueous polyvinyl alcohol. The process minimizes the exposure to heat of the catalyst carrier or suspending liquid.

6 Claims, 1 Drawing Figure

1mm=100Å

1mm=100A 4,472,513

LASER-SYNTHESIZED CATALYSTS

CROSS REFERENCE TO RELATED APPLICATIONS

This application is a continuation-in-part of co-pending U.S. Pat. application Ser. No. 220,638, filed Dec. 29, 1980, which is a continuation of U.S. Pat. application Ser. No. 075,554, filed Sept. 14, 1979 both now abandoned.

This invention relates to use of laser beams for the production of heterogeneous catalysts in the form of individual particles and loose, lacy aggregates of smaller particles on a solid polymeric organic catalyst carrier such as cross-linked polystyrene or of a suspension of a catalytic material in the form of said individual particles or said aggregates of some in a liquid such as aqueous polyvinyl alcohol.

BACKGROUND OF THE INVENTION

It is known to produce deposits of solids, especially metals or metal compounds, on high-surface area solid substrates, forming coatings a few molecules or atoms thick; and to form liquid dispersions of finely divided particles of such solids; which preparations are capable of catalyzing chemical reactions taking place upon the surface of such coatings or particles; such catalysis is known as heterogeneous catalysis and the catalysts are called heterogeneous catalysts. In the prior art, heterogeneous catalysts consisting of a deposit on a solid substrate have been produced, usually, by impregnating a substrate having high surface area per gram (called in this context a catalyst carrier or catalyst support) with a solution of a catalyst precursor compound which can be converted, for instance by heating or by chemical reaction, into an active catalytic form; drying the resulting impregnated carrier; repeating the impregnation with precursor and drying as necessary to deposit a sufficient quantity of the catalyst precursor on the carrier; and converting the precursor to an active supported catalyst.

Suspensions of active catalyst have been provided by forming a solution or dispersion of catalyst precursor in a suitable liquid and converting the precursor to catalytically active form by chemical reaction such as for example reduction.

It is also known to produce a stream of metal atoms, ions or clusters with high kinetic energies by use of a laser beam to blast such particles out of a metal surface. If such metal takes the form of a coating upon a transparent substrate, and the back of the metal coating is exposed through the transparent substrate to laser radiation, then a stream of mostly neutral metal atoms is vaporized from the front of the coating. See *Review of Scientific Instruments*, Vol. 45, No. 1, January 1974 pp. 50 and 52–56.

SUMMARY

In the present invention, a fine dispersion of solid catalytic material is produced by a process comprising evaporating a material, which upon evaporation and condensation forms catalytic material, from a coating on a transparent solid substrate onto a solid polymeric organic catalyst carrier or into a liquid by passing a laser beam, having sufficient power to evaporate said coating, through said solid transparent substrate and onto the back of said coating; and contacting said catalyst carrier or said liquid with the evaporated material, thereby condensing a catalytic material in the form of individual particles and loose, lacy aggregates of smaller particles onto said catalyst carrier or into said liquid. More particularly, the solid catalyst material is one which upon evaporation and condensation forms catalytic metal, especially metal capable of catalyzing hydrogenation reactions. (As is known, such hydrogenation catalysts also catalyze dehydrogenation reactions).

Our process produces finely dispersed high surface area catalyst supported on a solid polymeric organic carrier or suspended into a liquid while subjecting only the catalyst material but not the carrier or suspending liquid to high temperatures.

BRIEF DESCRIPTION OF THE DRAWING

The FIGURE is a transmission electron micrograph of the rhodium metal in the form of individual particles and loose lacy aggregates of particles deposited on a substrate in accordance with an embodiment of the present invention.

DETAILED DESCRIPTION

The basic requirements for purposes of this invention are quite simple, namely a transparent substrate carrying a coating of catalyst material, i.e. material which per se or upon decomposition by action of heat forms, when finely dispersed, an active catalyst; a laser beam having sufficient power to evaporate said coating material from said substrate; means directing the laser beam through the substrate and onto the back of the coating; a receiving body of high surface area solid catalyst carrier on which material evaporated from said coating will condense and adhere, or a receiving body of liquid into which said evaporated material can be condensed and will be suspended; and means to bring such receiving body into contact with the evaporated coating material.

Specifically the transparent substrate can be glass, for example a flat or curved glass plate, or a glass tube coated on the side toward the carrier material with the desired catalyst material or catalyst precursor. Transparent plastics may also be used.

Suitable catalyst materials for forming a coating on the transparent substrate are metals especially metals of Groups VIB, VIII and IB, in the form of metallic mirrors, obtained upon reduction of a dissolved salt in e.g. aqueous solution; or coatings of metal compounds (catalyst precursors) decomposable to catalytic metal by the heat imparted by the laser, and coated onto the transparent substrate, e.g. from the melt or by evaporation of a solution. A suitable metal coating can also be formed by sputtering in manner known per se.

Any thin coating is susceptible to being blasted off the transparent substrate by a laser beam of sufficient power, provided the coating is at least partially opaque to the laser radiation so that energy will be absorbed by the coating.

The laser beam can be produced by conventional means from conventional sources such as a ruby laser or a dye laser; and can be directed by conventional optics to take the desired path.

The receiving body can be a stirred liquid, in an interiorly coated container; or can be an agitated particulate solid polymeric organic catalyst carrier. The container can be rotated and the container or the laser beam can be traversed in a path designed to pass the beam over sustantially the whole back of the coating so as to subject substantially the whole coating to the action of the beam. The receiving body takes up and dissipates the heat produced upon condensation of the evaporated catalyst material. Such amount of heat is relatively small in our process, because only the small quantity of catalyst material evaporated from the transparent substrate need be brought to high temperature (not the catalyst carrier or suspending liquid). Accordingly, a relatively heat sensitive carrier or suspending liquid can be used if desired.

In a preferred embodiment of the present invention, the catalytic material is condensed into a liquid to form a suspension of individual particles in the 20–30Å range and loose, lacy aggregates of smaller particles in said liquid. It is a special feature of the present invention that the material of coating in the form of a film of material on a transparent solid substrate may be in intimate contact with the suspending liquid.

The preparation of suspensions or dispersions such as colloidal suspensions of solids in liquids, preferably stable colloidal suspensions is well known in the art. See, for example, Number 25 of the Advances in Chemistry Series entitled "Physical Functions of Hydrocolloids" at pp82–103, American Chemical Society, 1960.

Any liquid that wets and spreads over the surface of the condensed metal in the form of individual particles and loose, lacy aggregates of smaller particles so as to form a stable suspension of the condensed metal may be used as a suspending liquid.

Among the liquids found useful in the process of the present invention are organic compounds commonly used as solvents such as aromatic and aliphatic hydrocarbons, ketones, ethers and esters; aqueous solutions of polyvinyl alcohol, carboxymethylcellulose, methylcellulose, low molecular weight polyalkylene glycols and mono- and dialkyl ethers thereof wherein alkylene is ethylene or propylene and wherein alkyl is C-1 to C-20 such as diglyme, triglyme and tetraglyme and polyethylene glycol monomethyl ether; and low molecular weight polyethyleneimine.

Among the solid polymeric organic materials found useful as catalyst carriers within the scope of the present invention are any high surface area organic polymer such as polystyrene, polystyrene crosslinked with about one to forty weight percent of divinylbenzene and in the form of micro- or macroreticular beads or clusters of beads; polyesters such as condensation polymers of C-3 to C-20 hydroxyacids or of C-3 to C-20 diols such as ethylene glycol and C-3 to C-20 dicarboxylic acids such as terephthalic acid; polyamides such as condensation polymers of $\omega$-amino acids or of hexamethylenediamine and dicarboxylic acids such as adipic or sebacic acid, and of polymers formed from the ring opening of lactams such as $\epsilon$-caprolactam; and polyethers such as high molecular weight polyalkylene glycols such as polyethyleneglycol and polypropylene glycol and high molecular weight polyalkylene oxide such as polyethylene oxide and polypropylene oxide.

The examples which follow are illustrative of our invention and of the best mode contemplated by us for carrying out the invention but are not to be interpreted in a limiting sense.

EXAMPLE 1

A rhodium mirror was prepared on the inside wall of a glass vial. To assure good mechanical adhesion, the inside of the vial was sand blasted and etched with hydrofluoric acid. Specifically, a 0.1006 g sample of rhodium trichloride trihydrate, in aqueous solution, was reduced with aqueous formaldehyde, producing 0.0190 g of rhodium metal of which 8.7 mg adhered to the walls in the form of a mirror.

The vial was filled with 15 cc of a 2% by weight solution of polyvinyl alcohol (PVA) in water; and the back of the mirror was irradiated by a passively mode locked ruby laser (wavelength = 694 nm, power = 500 mJ/pulse, rate = 1 pulse per minute, pulse duration = $10^{-11}$ second) The vial was rotated and moved vertically to expose new areas of the coating to the laser beam, as the coating evaporated.

Before the evaporation was complete, a breakdown of the ruby laser occurred; whereupon the evaporation or "blow-off" was completed by using a free-running rhodamine dye laser (wavelength = 590 nm, energy = 2 mJ per pulse, rate = 20 pulses per second, pulse duration = $10^{-6}$ second).

Transmission electron micrographs of the resulting aqueous PVA suspension showed individual particles as small as 10 nm in diameter. Clusters as large as 100 nm were seen. These larger clusters appeared to be loose, lacy aggregates of smaller particles.

About 1.5 g of this suspension was charged into a thick walled stirred glass reactor together with 1.0 g of ethanol and 0.5 g of allyl alcohol. The reaction mixture was degassed, pressured with $1 \times 10^3$ kPa (150 psi) of hydrogen and immersed in a 100° C. oil bath. After 4 hours, the yield of propanol from the allyl alcohol was about 53%.

EXAMPLE 2

Rhodium was coated as in Example 1, as a flat mirror on glass. Active carbon particles (Amoco grade GX-31) were charged into a shallow box, covered by the flat mirror (rhodium side down); and were agitated by vibration while being exposed to a beam from a ruby laser as used in Example 1. The beam was moved up and down and side to side to pass the beam over substantially the whole area of the back of the rhodium coating. The rhodium thereby deposited on the active carbon carrier amounted to 1.7% by weight of the active carbon.

0.1 g of this supported catalyst was charged into a glass reactor as used in Example 1, together with 1.46 g of 1-hexene. The reaction mixture was degassed, pressurized with $1 \times 10^3$ kPa (150 psi) of hydrogen and immersed in a 100° C. oil bath. As shown by GC analysis, about 44% of the 1-hexene was converted to hexane within about 10 hours; and about 15% of the 1-hexene was isomerized to 2-hexene.

EXAMPLE 3

As in Example 2, a rhodium mirror was evaporated and condensed onto polystyrene cross-linked with 12% by weight of divinylbenzene (PolySep supplied by Poly Sciences, Inc. of Warrington, PA 18976). The rhodium mirror was in the form of a coating on flat glass and the crosslinked polystyrene particles were contained in a shallow box for which the rhodium mirror formed a cover, irradiated by a ruby laser as in Example 2 above. The resulting supported catalyst on the polystyrene carrier contained about 1% of rhodium per gram of carrier.

0.1 g of this catalyst was loaded into the thick walled glass reactor of Example 2 together with 1.78 g of 1-hexene. Hydrogenation as in Example 2 produced, within about 10 hours, about 18% hydrogenation of the 1-hexene to hexane and about 23% isomerization of the 1-hexene to 2-hexene as shown by GC analysis.

Other catalytic metals and catalytic mixtures of metals can be similarly deposited on supports from coatings on transparent substrates. Also other lasers, for instance dye lasers, can be used instead of a ruby laser with similar results.

Illustrative of additional metallic coatings on glass, usable in the process of this invention, are metallic mirrors such as specifically Group IB metals such as silver, produced in conventional manner by reducing silver nitrate with sodium potassium tartrate (Rochelle salt, $NaKC_4H_4O_6.4H_2O$); Group VIII metals such as platinum, produced from chloroplatinic acid (in solution in an alcohol/ether mixture) by ignition, in accordance with procedures for obtaining a glass-to-metal seal described in Handbook of Chemistry and Physics, 44th Ed., pg. 3431; Group VIB metals such as chromium by heating the metal in powder form and condensing the resulting vapor on glass; and other Group VIII metals such as nickel by electroplating onto glass rendered conductive by a thin layer of e.g. tin oxide; and as a general method, sputtering metal, by electron bombardment, onto glass.

Example 4

A rhodium mirror was deposited on a glass plate to the action of a mode-locked ruby laser having energy of 500 mJ per pulse and pulse duration of $10^{-11}$ sec. which calculates to power of $(500 \times 10^{-3})(10^{11}) = 5 \times 10^{10}$ watts. The radiation was focused to a spot of $10^{-1}$ sq.cm. area. The resulting material, blasted off from the glass plate, was directed to a substrate, a Formvar, on which it deposited. A transmission electron micrograph (See the FIGURE) was made, and demonstrates that the deposit has the form of individual particles and clusters of particles as small as 30 Å which appear to be loose, lacy aggregates of smaller particles.

We claim:

1. A process for producing a heterogeneous catalyst, comprising evaporating a metal from the group consisting of Groups IB, VIB and VII, which upon evaporation and condensation forms catalytic metal, from a coating on a transparent solid substrate onto a solid polymeric organic catalyst carrier, by passing a laser beam, having sufficient power to evaporate and blast off said coating, through said solid transparent substrate and onto the back of said coating; and contacting said polymeric organic catalyst carrier with the evaporated metal thereby condensing a catalytic metal in the form of individual particles and loose, lacy aggregates of smaller particles onto said catalyst carrier.

2. The process of claim 1 wherein said transparent substrate is glass and said metal condensed onto said solid polymeric organic catalyst carrier forms a hydrogenation dehydrogenation catalyst.

3. The process of claim 2 wherein said metal of the coating is rhodium metal and said carrier is polystyrene crosslinked with divinyl benzene in the form of beads or clusters of beads.

4. A process for producing a heterogeneous catalyst, comprising evaporating a metal from the group consisting of Groups IB, VIB and VIII, which upon evaporation and condensation forms catalytic metal, from a coating on a transparent solid substrate into a liquid, by passing a laser beam, having sufficient power to evaporate and blast off said coating, through said solid transparent substrate and onto the back of said coating; and contacting said liquid with the evaporated metal thereby condensing a catalytic metal in the form of individual particles and loose, lacy aggregates of smaller particles onto said liquid.

5. The process of claim 4 wherein the process further comprises placing said metal of the coating and said liquid in intimate contact with one another and wherein said catalytic metal is condensed in the form of a suspension of individual particles and loose, lacy aggregates of smaller particles in said liquid.

6. The process of claim 4 wherein said liquid is a 2% by wt. solution of polyvinyl alcohol in water.

* * * * *